United States Patent [19]

Matsuura et al.

[11] Patent Number: 4,504,772

[45] Date of Patent: Mar. 12, 1985

[54] METHOD OF SENSING CURRENT POSITION IN POSITION CONTROL SYSTEM

[75] Inventors: Hitoshi Matsuura; Etsuo Yamazaki, both of Hachioji; Hiroshi Sakurai, Hino, all of Japan

[73] Assignee: Fanuc Ltd., Minamitsuru, Japan

[21] Appl. No.: 442,423

[22] Filed: Nov. 17, 1982

[30] Foreign Application Priority Data

Nov. 25, 1981 [JP] Japan .................................. 56-188595

[51] Int. Cl.³ .............................................. G05B 19/28
[52] U.S. Cl. .................................. 318/603; 318/560; 318/569; 318/632
[58] Field of Search ............... 318/568, 569, 603, 625, 318/578, 602, 632; 364/170

[56] References Cited

U.S. PATENT DOCUMENTS 4,074,177 2/1978 Olig ..................................... 318/602

Primary Examiner—Stanley J. Witkowski
Assistant Examiner—Saul M. Bergmann
Attorney, Agent, or Firm—Staas & Halsey

[57] ABSTRACT

A method of sensing the current position of a movable element in a position control system which includes first and second control devices each having command pulse generating means and error storage means for computing and storing an error between a number of command pulses and a number of feedback pulses indicative of an amount of motor movement, a speed control circuit for driving and controlling the motor on the basis of the error in the storage means, and a switching circuit for selectively connecting the first and second control devices to the speed control circuit, the current position of the movable elements being sensed by the first control device when the second control device is connected to the speed control circuit. The method includes the following steps, when the second control device is connected to the speed control circuit, of reading and storing, as a steady deviation, the error in the error storage means of the first control device after the motor is rotated in accordance with the magnitude of drift of a closed loop formed by the second control device. The data in a current position register of the first control device is then updated on the basis of an arithmetic difference found by subtracting the stored steady deviation from the data in the error storage means of the first control device and revised in the error storage means of the first control device on the basis of the arithmetic difference.

7 Claims, 9 Drawing Figures

METHOD OF SENSING CURRENT POSITION IN POSITION CONTROL SYSTEM

CROSS-REFERENCE TO RELATED U.S. APPLICATIONS

This application is related to U.S. Ser. No. 442,422 filed Nov. 17, 1982 and U.S. Ser. No. 442,424 filed Nov. 17, 1982.

BACKGROUND OF THE INVENTION

This invention relates to a method of sensing the current position in a position control system for controlling the position of a single servomotor by means of a plurality of control devices. More particularly, the invention relates to an improved method of sensing the current position in a position control system so as to eliminate a positional error when switching among a plurality of control devices to drive and control a servomotor.

A system is available in which a movable machine element driven by a single servomotor is positionally controlled by placing the servomotor alternatively under the control of a plurality of control devices. By way of example, when machining a single workpiece by a machine tool operated under numerical control, portions of the workpiece that involve complex programming because of the sophisticated shape thereof are subjected to tracer control machining by a tracer control device; whereas the portions of the workpiece that are simple in shape are subjected to ordinary numerically controlled machining by a numerical control device. Such a technique makes it possible to machine the workpiece into the desired shape.

In the above-described position control system, the servomotor of the machine tool is positionally controlled by both the numerical control device and tracer control device to machine the workpiece as desired. Accordingly, during the period that the numerical control device is connected to the servomotor to drive the same, no connection exists between the servomotor and the tracer control device. Conversely, during the period when there is a connection between the tracer control device and the servomotor to drive the motor, the numerical control device is disconnected from the motor.

The numerical control device and tracer control device each incorporate a current position register to keep track of the current position of the movable machine element driven by the servomotor. Since control of the movable machine element of the machine tool is effected on the basis of the data stored in these registers, it is necessary for the amount of servomotor rotation to be sensed and for the current position registers to be updated based upon such rotation. This is true even for the position register incorporated in whichever of the control devices is not connected to the servomotor during such rotation. To this end, a so-called follow-up control method is available wherein the data stored in the error register of a position control circuit, provided in each of the control devices, is read in order to update the current position register. Because of an offset voltage which develops in the position control circuit, however, a problem arises wherein the servomotor is caused to drift each time it is switched over from one control device to the other. The drift is accompanied by an error which accumulates in the current position registers.

SUMMARY OF THE INVENTION

Accordingly, an object of the present invention is to provide a method of sensing the current position in a position control system for the type in which a single servomotor is controlled by a plurality of control devices. This method prevents the accumulation of an error caused by switching among the control devices.

Another object of the present invention is to provide a method for sensing the current position in a position control system which prevents the data stored in a current position register from being changed by switching from one control device to another.

Still another object of the present invention is to provide a method for sensing the current position in a position control system in which accurate positional control is possible even when switching among control devices.

A further object of the present invention is to provide a method for sensing the current position in a position control system which prevents a servomotor from being rotated in a direction which will cause an error to accumulate whenever the servomotor is switched from one control device to another.

Other features and advantages of the present invention will be apparent from the following description taken in conjunction with the accompanying drawings, in which like reference characters designate the same or similar parts throughout the figures.

DESCRIPTION OF THE PREFERRED EMBODIMENT

Figure 1:
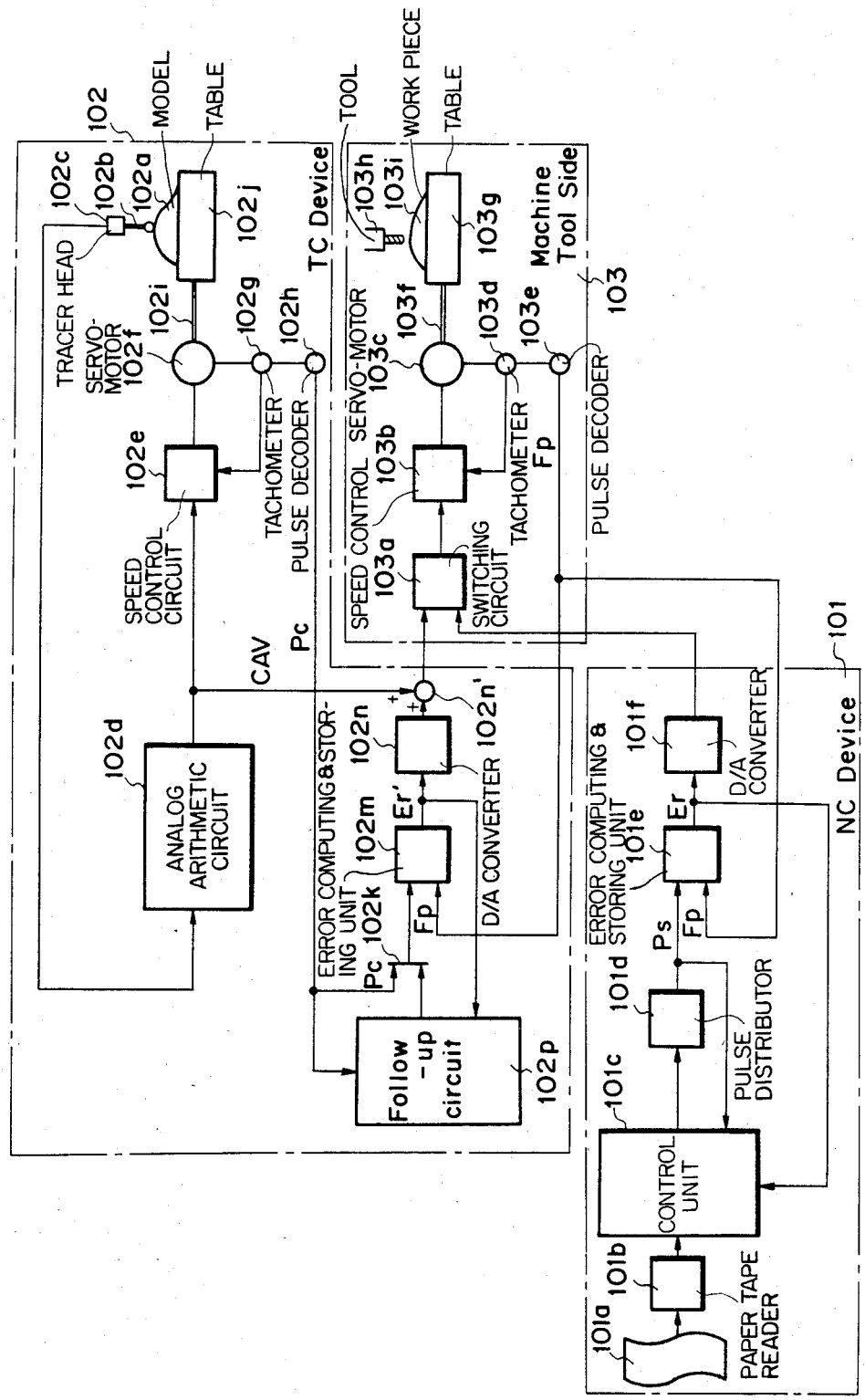
FIG. 1 is a block diagram of a numerical control system for driving a single servomotor by means of a tracer control device and numerical control device.

FIG. 1 is a block diagram of an example of a position control system to which the present invention may be applied. In FIG. 1, the control system drives a servomotor by switching between a numerical control device (referred to hereinafter as an NC device) and a tracer control device (referred to hereinafter as a TC device), designated at 101 and 102, respectively.

The NC device 101 includes a paper tape reader 101*b* for reading a paper tape 101*a* in which NC data has been punched, and a control unit 101*c*. The control unit 101*c* causes the tape reader 101*b* to read in the NC command data from the paper tape 101*a*, and decodes the read NC data, delivering, e.g., M, S and T function commands to the machine through a power sequence controller and a move command to a pulse distributor 101*d* upon initiating an arithmetic operation based on incremental values. The control unit 101*c* controls the updating of a current position register and a so-called remaining movement register, and stores the current position of a movable machine element, such as the table or tool of a machine tool, by executing follow-up control, described later, when the NC device 101 is disconnected from the servo system. The pulse distributor 101d executes well-known pulse distribution computations on the basis of incremental values, and generates distributed pulses (command pulses) $P_s$ at a frequency corresponding to a commanded speed. Numeral 101e denotes an error computing and storing unit which computes the difference (error) $E_r$ between the number of the input command pulses $P_s$ received from the pulse distributor 101d and the number of feedback pulses $F_p$ generated by a pulse coder, as will be described below. A digital signal indicative of the error $E_r$ is applied to a DA converter 101f for converting the error $E_r$ into an analog voltage.

The block indicated at 103 represents the machine tool side. Provided on the machine side are a switching circuit 103a, a speed control circuit 103b, including a speed control unit, a servo-amplifier unit and the like, which is switched between the NC device 101 and TC device 102 by the switching circuit 103a, a servomotor 103c, a tachometer 103d for generating a voltage indicative of the actual rotational speed of the servomotor 103c, a pulse coder 103e for generating a feedback pulse Fp each time the servomotor rotates by a predetermined amount, a ball screw 103f rotated by the servomotor 103c, a table 103g transported by the ball screw 103f as the ball screw rotates, and a tool 103h for machining a workpiece 103i.

Let us assume that the NC device 101 is connected to the machine tool side 103 by the switching circuit 103a. When the control unit 101c issues a move command (incremental values along each axis) under this condition, the pulse distributor 101d executes the pulse distribution computation on the basis of the incremental values and produces the distributed pulses $P_s$ which are applied to the error computing and storing unit 101e, the content of which becomes non-zero as a result. Accordingly, the DA converter 101f provides a voltage corresponding to the content of the unit 101e, and the motor 103c is driven by the speed control circuit 103b so as to move the table 103g. When the motor 103c has rotated by a predetermined amount, the feedback pulse Fp is generated by the pulse coder 103e and is applied to the error calculating and storing unit 101e, with the latter storing the difference $E_r$ between the number of command pulses $P_s$ and the number of feedback pulses Fp. Thenceforth, servo control is executed in such a manner that the error $E_r$ approaches zero, with the table being transported to the target position as machining is carried out. It should be noted that the command pulses $P_s$ generated by the pulse distributor 101d are also applied to the control unit 101c as the foregoing processing is being executed, the pules $P_s$ serving to update a current position register and a register which stores an amount of movement yet to be executed.

The TC device 102 includes a model 102a, a stylus 102b in contact with the surface of the model, a tracer head 102c, an analog arithmetic circuit 102d for producing signals indicative of tracer speed components along each axis, based on a displacement signal produced by the stylus 102b, a speed control circuit 102e, a motor 102f, a tachometer 102g for sensing the speed of the motor 102f, a pulse coder 102h for generating a pulse $P_c$ each time the motor 102f rotates a predetermined amount, a ball screw 102i rotated by the motor 102f, a table 102j transported by the ball screw 102d as it rotates, an OR gate 102k, and an error computing and storing unit 102m, comprising a reversible counter, for storing an error $E_r$, between the number of pulses (command pulses) $P_c$ generated by the pulse coder 102h, and the number of feedback pulses Fp generated by the pulse coder 103e on the machine tool side 103. Also provided are a DA converter 102n for converting the error $E_r$, into an analog voltage, a mixing circuit 102n', and a follow-up circuit 102p which executes follow-up control, to be described below.

Assume now that the TC device 102 is connected to the servo circuitry on the machine tool side 103 by the switching circuit 103a. When the table 102j is driven along the feed axis (Y-axis) by the motor 102f, the stylus 102b is displaced in accordance with the shape of the model 102a and produces a displacement signal which is fed into the analog arithmetic circuit 102d. As a result, the analog arithmetic circuit 102d produces a signal indicative of the tracer speed components along each axis, corresponding to the stylus displacement. The signal, namely a command voltage CAV, causes the motor 102f to rotate further, and also rotates the motor 103c. When the motors 102f and 103c are rotated by a predetermined amount, the pulse coders 102h and 103e generate the command pulse $P_c$ and the feedback pulse Fp, which enter the error computing and storing unit 102m. The content of the unit 102m will be zero if the tracer and machine tool sides are in perfect synchronization, and non-zero when they are not. In order to maintain synchronization, therefore, the DA converter 102n produces a voltage commensurate with the contents of the unit 102m, and the mixing circuit 102n' combines this voltage with the command voltage CAV, whereby synchronization is achieved. In other words, servo control is executed in such a manner that the error voltage $E_r$, produced by the DA converter approaches zero, with the table 103g being made to follow, i.e., to move in synchronization with, the table 102j. As the foregoing processing is being carried out, the command pulses $P_c$ from the pulse coder 102h are fed into the follow-up circuit 102p to update the content of a current position register incorporated within the circuit.

It is essential in an arrangement of this type that the NC device 101 store internally the current position of the machine tool, that is, the position of table 103g, at all times even when tracer control is being carried out owing to a connection between the TC device 102 and machine tool side 103. Likewise, it is necessary for the TC device 102 to constantly store the current position of the machine tool even when ordinary numerical control is being performed owing to a connection between the NC device 101 and the machine tool.

In view of the above requirement, a so-called follow-up control method has been proposed according to which the content of the current position registers, located in both the NC device and TC device, are made to follow the current position of the machine tool element at all times, even though the machine tool 103 is not connected to both control devices at the same time. The follow-up control technique will now be described in brief for a case where the TC device 102 and machine tool 103 are interconnected, that is, where the NC device 101 is disconnected from the servo system.

When the motor 103c of the machine tool 103 is rotated under the control of the TC device 102, the pulse coder 103e produces the feedback pulses FP, each pulse being generated whenever the motor 103c rotates a predetermined amount. The content of the error computing and storing unit 101e of NC device 101 is updated, i.e., decremented by one step in the case of forward rotation, each time a feedback pulse Fp is produced. If we assume that the content of the error computing and storing unit 101e initially is zero, then its content will be decremented to $-m_1$ by the generation of $m_1$—nunmber of feedback pulses. The $-m_1$ data is read by the control unit 101c which performs the operation:

$$M + m_1 \rightarrow M \ldots (1)$$

with respect to the content M of a current position register located within the control unit 101c. In (1), the initial value of M is $M_o$. The control unit 102 also changes the sign of the read data from − to +, applying $+m_1$ to the pulse distributor 101d. The pulse distributor 101d responds to the $+m_1$ data by immediately performing a pulse distribution operation to produce the distributed pulses $P_s$. The distributed pulses $P_s$ enter the the error computing and storing unit 101e, the content thereof being updated by one step in the positive direction each time a pulse $P_s$ arrives. The error computing and storing unit 101e concurrently receives the feedback pulses Fp at its other input as long as the motor 103c is rotating. These pulses update the unit 101e by one step in the negative direction each time one of them arrives. Accordingly, if we assume that the time at which the content $-m_1$ is read out of unit 101e is $t_1$, that the time at which the $m_1$—number of distributed pulses $P_s$ are generated is $t_2$, and that $m_2$—number of feedback pulses FP are generated between times $t_1$ and $t_2$, then the contents of the error computing and storing unit 101e at time $t_2$ will be $-m_2$.

When a number of distributed pulses $P_s$ equivalent to the commanded quantity $m_1$ have been produced, the control unit 101c generates internally a signal DEN indicative of the end of the pulse distribution operation. The control unit 101c responds to the signal DEN by once again reading out the contents ($-m_2$) of the unit $101_e$ and performing the following addition:

$$M + m_2 \rightarrow M \ldots (1')$$

The control unit 101e also applies the data $m_2$ to the pulse distributor 101d. Owing to the arithmetic operation (1') above, the content M of the current position register becomes $m_1 + m_2 + M_o$ (where $M_o$ is the initial value stored in the current position register prior to follow-up control). Thenceforth, each time the pulse distribution end signal DEN is generated, the control unit 101c reads out the contents $-m_i$ ($i=1,2,3 \ldots$) of the error computing and storing unit 101e, performs the addition:

$$M + m_i \rightarrow M \ (= \Sigma m_i + M_o) \ldots (1'')$$

and applies the numerical value $m_i$ to the pulse distributor 101d. From then on, the aforesaid operations are repeated.

The foregoing is summarized by the following table:

| Time | t1 | t2 | t3 | — | ti | — | tj | tj + 1 |
|---|---|---|---|---|---|---|---|---|
| Number of pulses FP generated | $m_1$ | $m_2$ | $m_3$ | ... | $m_i$ | ... | $m_j$ | 0 |
| Number of pulses Ps generated | 0 | $m_1$ | $m_2$ | ... | $m_{i-1}$ | ... | $m_{j-1}$ | $m_j$ |
| Content of error register | $-m_1$ | $-m_2$ | $-m_3$ | ... | $-m_i$ | ... | $-m_j$ | 0 |

In the table shown above, t1 is the time at which the contents of the error computing and storing unit 101e are initially read, ti ($i=2,3 \ldots$) is the time at which the pulse distribution end signal DEN is generated, and $m_i$ represents the number of feedback pulses produced between time ti-1 and time ti. It will be appreciated from the table that the total number M of feedback pulses FP produced up to time tj+1 may be expressed by the following:

$$M = \sum_{i=1}^{j+1} m_i$$

which is precisely in agreement with the sum total exhibited by the error computing and storing unit 101e. The current position register within the control unit 101c will thus store the current position of the machine tool element at all times in accordance with the follow-up control method.

The foregoing dealt with a case where the NC device 101 is disconnected from the machine tool servo system. When the TC device 102 is disconnected, follow-up control is executed by the follow-up circuit 102p to store the current position of the machine tool element in the associated current position register at all times.

Figure 2:
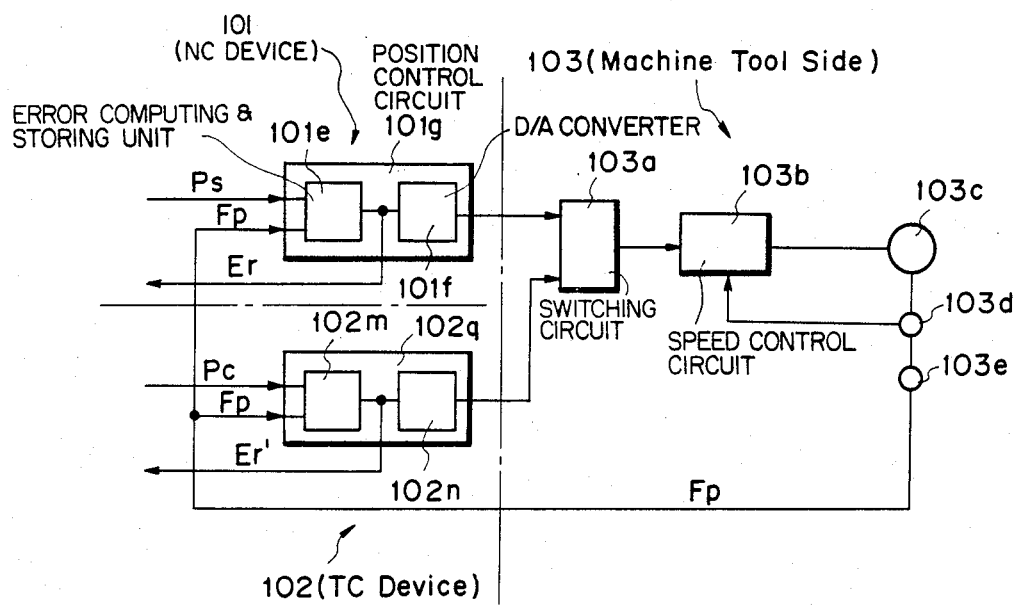
FIG. 2 is a detailed block diagram of the principal portion of the block diagram of FIG. 1.

The principal portion of the system shown in FIG. 1 is illustrated in FIG. 2. Numerals 101g and 102q denote position control circuits, respectively, the former being constituted by the error computing and storing unit 101e and DA converter 101f, the latter by the error computing and storing unit 102m and DA converter 102n. In a system for driving a single motor by the two different control devices 101 and 102, the switching circuit 103a selects the desired one of the position control circuits 101g and 102q of the respective control devices 101 and 102 and connects it to the speed control circuit 103b so that a workpiece may be machined under tracer control on some occasions and under ordinary numerical control on others.

In a system of the above type, the position control circuits 101g and 102q and their peripheral circuits develop an offset voltage. When the position control circuit 101g of the NC device 101 is connected to the speed control circuit 103b to form a closed loop, the motor 103c will not stop even when the data (error) stored in the error computing and storing unit 101e becomes zero. Instead, the motor will come to rest when the error attains a value of $-l_1$. Likewise, when the position control circuit 102q of the TC device 102 is connected to the speed control circuit 103b to form a closed loop, the motor 103c will not stop even when the data (error) stored in the error computing and storing unit 102m becomes zero. Instead, the motor will come to rest when the error attains a value of $-l_2$. Consequently, if the above-mentioned errors $l_1$ and $l_2$ (referred to as steady deviations) are unequal, that is, if the drift values developed in each closed loop differ, then the motor 103c will be rotated by an amount corresponding to the difference from one drift value to the other whenever the machine tool is switched between the control devices. Furthermore, in the disconnected control device where the current position data is updated internally in accordance with the follow-up control technique, an error accumulates since the motor 103c is moved by an amount equivalent to $l_1$ or $l_2$ each time a switch is made, even when command pulses are not applied. Also, the content of the current position register in one of the control devices is updated in increments of $(l_1+l_2)$ with each switching operation, so that there is a change in the current position indication in the control device.

Figure 3:
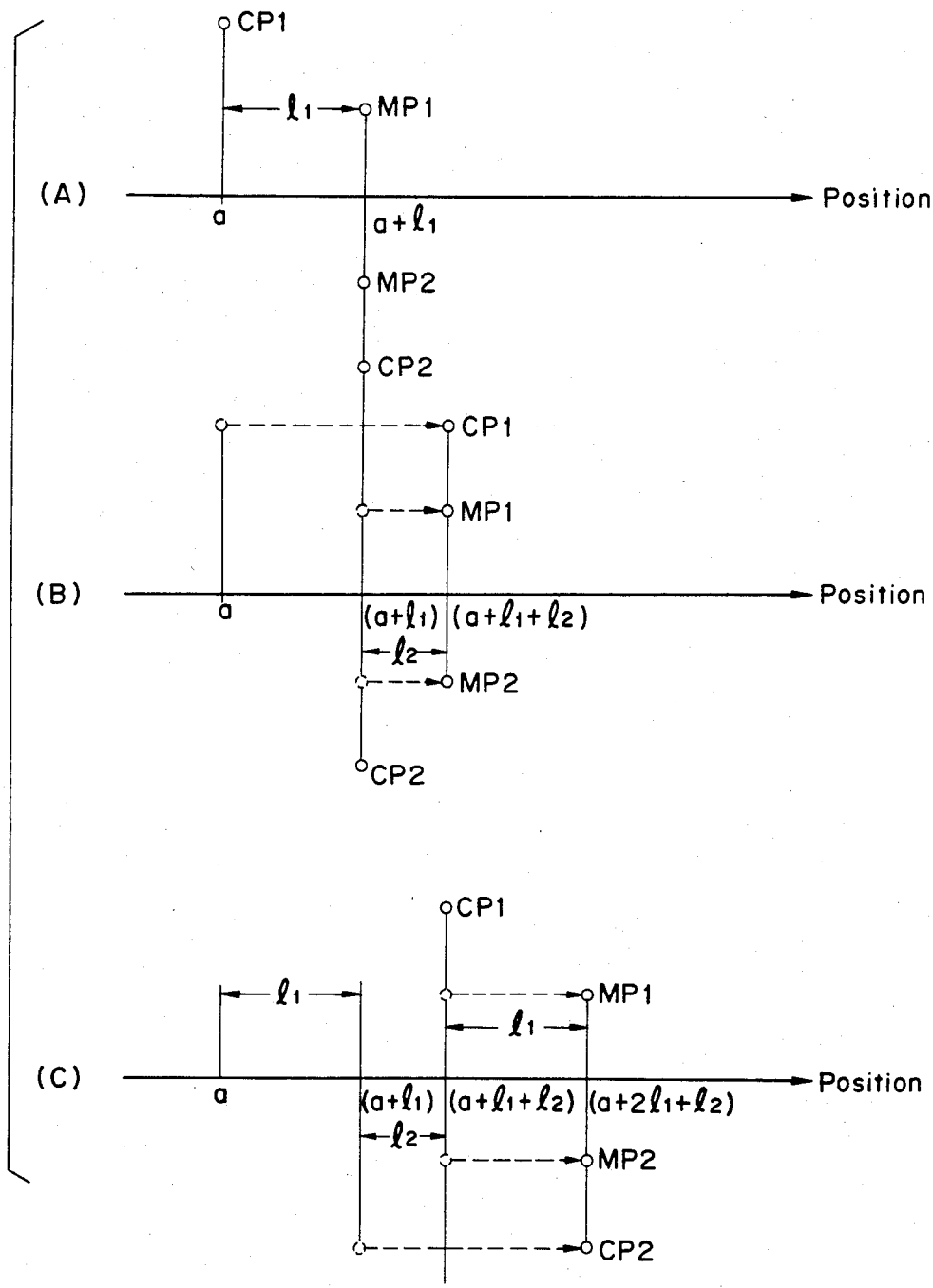
FIGS. 3A—3C is are diagrams for describing the conventional method of sensing current position.

The foregoing phenomenon that occurs with the changeover from one control device to the other may be understood from FIG. 3, which illustrates movement along one axis only. $CP_1$ indicates the current position stored in the NC device, $MP_1$ and $MP_2$ the machine element position, $CP_2$ the current position stored in the TC device, and $l_1$ and $l_2$ the steady deviations of the NC device and TC device, respectively. It should be noted that the machine element position is indicated by the two symbols $MP_1$ and $MP_2$ for descriptive purposes only, i.e., $MP_1$ and $MP_2$ designate exactly the same point along the axis of movement.

We will assume that the initial conditions are such that the NC device 101 is connected to the servo system of the machine tool 103, and that the motor is at rest. The situation is shown in (A) of FIG. 3. Here the current position $CP_1$ stored in the current position register located in the NC device 101 is indicated by a, whereas the machine element actually is stopped at the position $MP_1$ and $MP_2$ $(a+l_1)$ displaced from a by the steady deviation $l_1$. Furthermore, owing to follow-up control, the current position $CP_2$ stored in the current position register of the TC device 102 is indicated by $(a+l_1)$. Also, the data stored in the error computing and storing units 101e and 102m are $-l_1$ and 0, respectively. If the NC device 101 is now disconnected from the servo system of the machine tool 103 and the TC device is connected thereto instead, the machine element position $MP_2$ is shifted over a distance $+l_2$ owing to the changeover, since the steady deviation for the TC device 102 is $-l_2$. Thus the machine element stabilizes and comes to rest at the position $MP_2$ given by $(a+l_1+l_2)$, as shown in (B) of FIG. 3. Meanwhile, owing to the shift in the machine element position equivalent to $l_2$, the pulse coder 103e (FIG. 1) generates $l_2$—number of feedback pulses Fp, whereby the contents of the error computing and storing units 101e and 102m (FIGS. 1 and 2) attain values of $-(l_1+l_2)$ and $-l_2$, respectively. Thereafter, the content $CP_1$ of the current position register in the NC device 101 eventually becomes $(a+l_1+l_2)$ due to follow-up control, and the content of the error computing and storing unit 101e goes to zero. This corresponds to the condition shown in (B) of FIG. 3. In other words, by switching over from the NC device 101 to the TC device 102, the machine element position $MP_2$ is shifted by $l_2$, and the content $CP_1$ of the current position register in the NC device 101 changes by $(l_1+l_2)$.

Under these conditions, when the machine tool 103 is switched back to the NC device 101 from the TC device 102 without the application of command pulses, the machine element position $MP_1$ is shifted over a distance $+l_1$ owing to the changeover, since the steady deviation for the NC device 101 is $-l_1$. Thus the machine element stabilizes and comes to rest at the position $MP_1$ given by $(a+2l_1+l_2)$, as shown in (C) of FIG. 3. Meanwhile, owing to the shift in the machine element position equivalent to $l_1$, the pulse coder 103e (FIG. 1) generates $l_1$—number of feedback pulses Fp, whereby the contents of the error computing and storing units 101e and 102m attain values of $-(l_1+l_2)$ and $-l_1$, respectively. Thereafter, the content $CP_2$ of the current position register the TC device 102 becomes $(a+2l_1+l_2)$ owing to follow-up control, and the content of the error computing and storing unit 101m goes to zero. This corresponds to the condition shown in (C) of FIG. 3.

Accordingly, each time the machine tool is switched over from one control device to the other, the actual machine element position $MP_1$ and $MP_2$ shifts by $l_1$ or $l_2$ in alternating fashion, while the current position registered in the control device which is disconnected shifts by $(l_1+l_2)$.

Thus, in a case where two control devices have different drift values attributed to the respective offset voltages, with the conventional method the motor is caused to rotate, thereby transporting the movable machine element, whenever the machine tool is switched between the control devices. Furthermore, in a case where the current position registered in the control devices is made to follow-up the machine element position by means of follow-up control, an error accumulates and the current position indication changes as the machine element position is moved with each switching operation, even when no command pulses are generated.

In view of the foregoing, the present invention seeks to effect an improvement in a system for driving a servomotor by means of different control devices. The improvement is such that no error accumulates because of a changeover from one control device to another, and such that there is no change in current position registered in the control devices owing to the switching operation and, hence, no change in the current position indication.

The method of sensing the current position according to the present invention will be described with reference to FIG. 4.

First, the gist of the inventive method can be understood by better recognizing the flaw in the prior art. Specifically, when the control devices are switched, the machine element position is shifted by $l_1$ or $l_2$, namely by the steady deviation of the connected control device, and the content of the error computing and storing unit of the disconnected control device becomes $-(l_1+l_2)$. The disconnected control device then has the internally registered current position updated by $(l_1+l_2)$ owing to follow-up control, so that the registered data is brought into agreement with the new machine element position. In addition, the content of the error computing and storing unit is cleared to zero. However, because the current position registered in the disconnected control device is changed by $(l_1+l_2)$ owing to follow-up control, and because the content of the error computing and storing unit is cleared to zero, the machine position is shifted by $l_1$ or $l_2$ with each subsequent switching operation, causing an error to accumulate in the disconnected control device. Moreover, a change in the current position brings about a shift in the current position indication.

Accordingly, if the content of the error computing and storing unit is held at $-(l_1+l_2)$ without updating the current position register in the disconnected control device, then no error will arise between the current position as registered and the actual machine element position. Such is the aim of the inventive method. This will now be described in greater detail with reference to FIG. 4.

We will assume that the initial conditions are such that the NC device 101 is connected to the servo system of the machine tool 103, and that the motor is at rest. The situation is shown in (A) of FIG. 4. Here the current position $CP_1$ stored in the current position register located in NC device 101 is indicated by a, and the machine element is stopped at the position $MP_1$ and $MP_2$ $(a+l_1)$ displaced from a by the amount of drift $l_1$. Furthermore, owing to follow-up control, the current position $CP_2$ stored in the current position register of the TC device 102 is indicated by $(a+l_1)$. Also, the items of data stored in the error computing and storing units 101e and 102m at this time are $-l_1$ and 0, respectively. If the NC device 101 is now disconnected from the servo system of the machine tool 103 and the TC device 102 is connected thereto instead, the machine element position $MP_2$ is shifted over a distance $l_2$ owing to the changeover, since the steady deviation for the TC device 102 is $l_2$. Thus the machine element stabilizes and comes to rest at the position $MP_2$ given by $(a+l_1+l_2)$, as shown in (B) of FIG. 4. Meanwhile, owing to the shift in the machine element position equivalent to $l_2$, the pulse coder 103e (FIG. 1) generates $l_2$-number of feedback pulses Fp, whereby the contents of the error computing and storing units 101e and 102m (FIGS. 1 and 2) attain values of $-(l_1+l_2)$ and $-l_2$, respectively. Now, with the conventional method, the content $CP_1$ of the current position register in the NC device 101 is changed from a to $(a+l_1+l_2)$ owing to the introduction of $(l_1+l_2)$ by follow-up control, and the content of the error computing and storing unit 101e was cleared to zero. In accordance with the present invention, however, the content $-(l_1+l_2)$ $(=B)$ of the error computing and storing unit 101e is read and stored in a memory (i.e., in a register) before follow-up control is performed by the NC device 101, and then follow-up control is executed on the basis of a value D obtained by subtracting the stored value B from the content A of the error computing and storing unit 101e. As a result, in a case where the TC device is not producing command pulses and the motor 103c is at rest, the condition $A=B$ will hold and D will be zero. Therefore, even though follow-up control is executed, the content of the current position register in the NC device 101 remains unchanged, and the content of the error computing and storing unit 101e has the value $-(l_1+l_2)$. This is the condition shown in (B) of FIG. 4.

When the NC device is reselected in FIG. 4(B), the value stored in the error computing and storing unit 101e is $-(l_1+l_2)$ regardless of the fact that the steady deviation of the NC device is $l_1$. Accordingly, as shown by the dashed lines in FIG. 4(C), the machine element position $MP_1$ moves a distance $l_2$, in a direction opposite to that moved in FIG. 4(B), and stops at $(a+l_1)$. As a result, $l_2$-number of feedback pulses Fp are generated, the content of error computing and storing unit 101e stabilizes at $-l_1$, and the content of error computing and storing unit 102m becomes zero. Even though follow-up control is executed, the content of the current position register in the TC device 102 remains unchanged, being held at $(a+l_1)$. This is shown in FIG. 4(C). It is noteworthy to mention that the condition shown in FIG. 4(C) is exactly the same as the initial condition, illustrated in FIG. 4(A). Regardless of subsequent switching operations, therefore, the contents of the current position registers in the NC device 101 and the TC device 102 do not change, and the machine element position merely shifts back and forth between $(a+l_1)$ and $a+l_1+l_2$ without any accumulation of an error.

Figure 4:
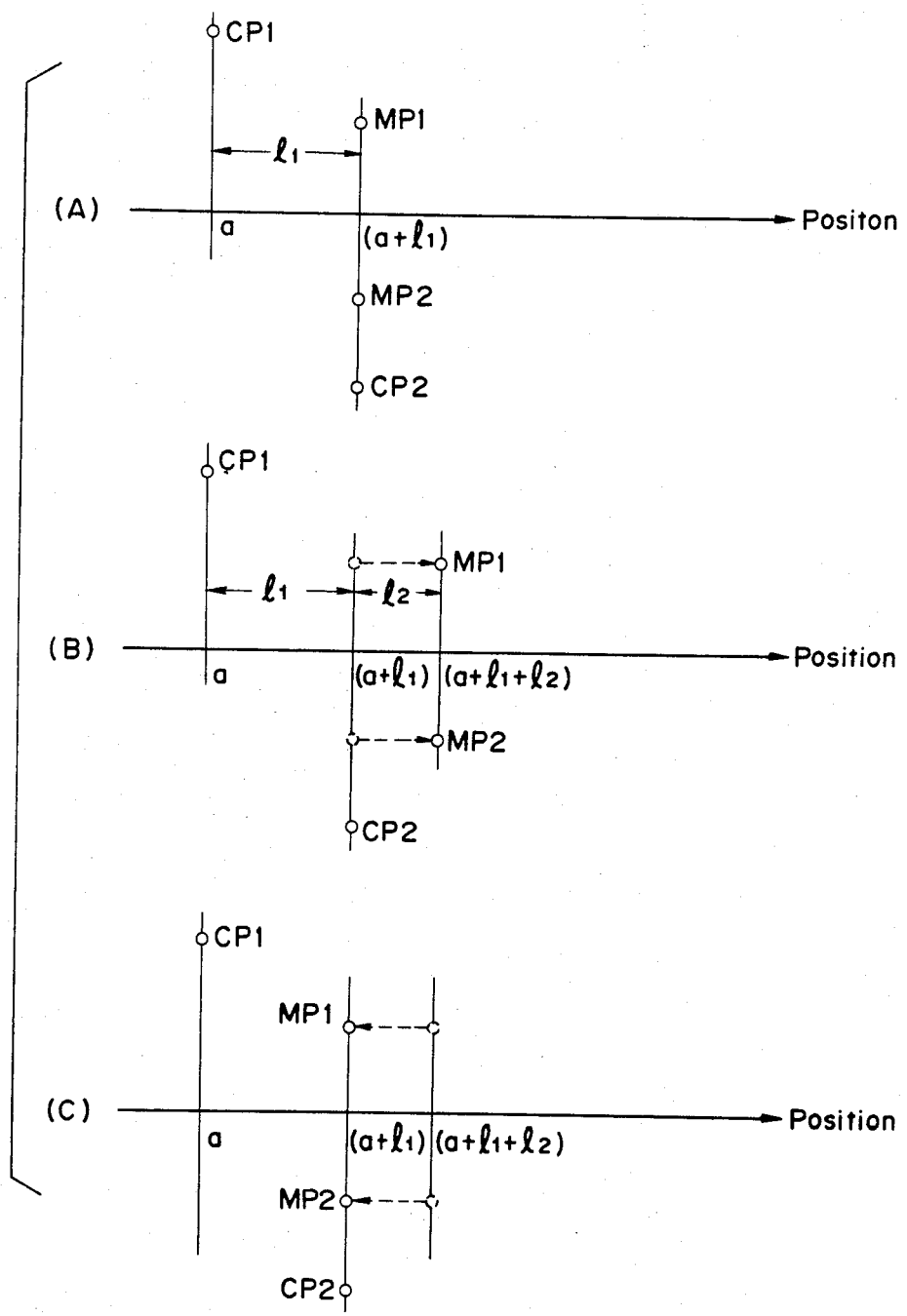
FIGS. 4A—4C are illustrative views useful in describing the method of sensing the current position according to the present invention.

In the description rendered with reference to FIG. 4, it is assumed that the machine tool is not being moved by the command pulses and is, therefore, at rest. However, even if the machine tool is moved in accordance with command pulses generated by the TC device 102 after being switched over thereto, the NC device 101 will record the current position correctly, and no error will result from the switching operation, as long as the NC device 101 executes follow-up control in accordance with the aforementioned formula $D=(A-B)$. That is, at the instant the machine tool comes to rest after the generation of N command pulses, the current position registered in the NC device will indicate $(a+N)$, so that the correct current position will be stored. Further, the content of the error computing and storing unit 101e will be $-(l_1+l_2)=B$. Accordingly, when the machine tool 103 is subsequently switched over from the TC device 102 to the NC device 101, the machine position $MP_1$ will move to the left by the distance $l_2$, as shown in FIG. 4(C), and no error will result.

Figure 5:
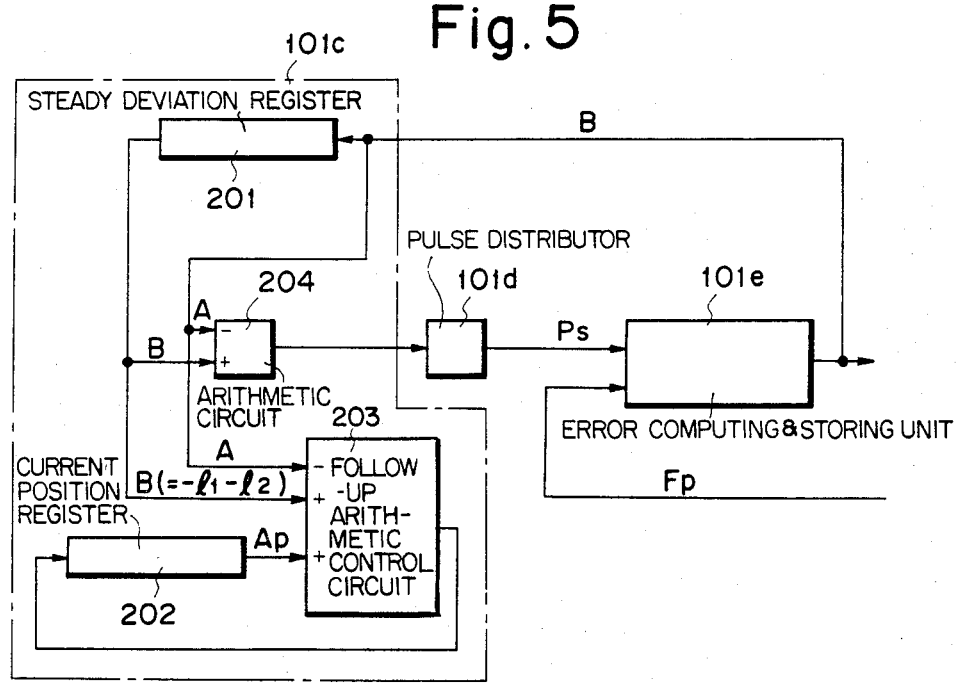
FIG. 5 is a block diagram of an embodiment of an arrangement for practicing the method of the present invention.

Reference will now be had to FIG. 5 to describe follow-up control circuitry located in the control unit of the NC device.

Numeral 201 denotes a steady deviation register which, upon a changeover operation, stores the content $-(l_1+l_2)=B$ of the error computing and storing unit 101e before the NC device 101 begins follow-up control and after the machine element position has moved by $l_2$ owing to the offset voltage of the TC device 102. Numeral 202 denotes a current position register for storing the current position AP. Numeral 203 denotes a follow-up arithmetic circuit whose inputs are the content B of the steady deviation register 201, the old current position AP stored in the current position register 202, and the content A of the error computing and storing unit 101e. On the basis of these inputs, the arithmetic circuit 203 performs the operation given by the following expression:

$$AP-(A-B)\rightarrow AP \ldots (1)$$

to update the current position. Numeral 204 denotes an arithmetic circuit for performing the operation;

$$-(A-B)=D \ldots (2)$$

and for applying the result to the pulse distributor 101d.

When the machine tool is switched over from the NC device 101 to the TC device 102 and the machine tool element is shifted by $l_2$ owing to the offset voltage developed in the TC device, $l_2$-number of feedback pulses are generated and the content of the error computing and storing unit 101e becomes $-(l_1+l_2)=B$. The error B is stored in the steady deviation register 201, followed by the start of follow-up control. In other words, the follow-up arithmetic circuit 203 performs the operation given by expression (1) above, and the arithmetic circuit 204 performs the operation given by expression (2). Since $A=B$ in a case where the machine element has not yet been moved under the control of the TC device 102, the condition $D=0$ holds, no updating of the current position AP takes place and the content of the error computing and storing unit 101e remains unchanged, being held at $-(l_1+l_2)=A$. On the other hand, when the machine element is moved under the control of the TC device 102 and $m_1$-number of feedback pulses Fp are generated, the content of the error computing and storing unit 101e becomes $-(l_1+l_2+m_1)$. As a result, the content of the current position register 202 is updated to $(AP+m_1)$ in accordance with the foregoing arithmetic operations (1) and (2), and the pulse distributor 101d is issued a command equivalent to $m_1$. When this occurs, the pulse distributor 101d immediately begins the pulse distribution operation for the production of the distributed pulses $P_s$, namely the command pulses. These pulses are applied to the error computing and storing unit 101e, incrementing the content thereof one step in the positive (forward) direction each time a distributed pulse $P_s$ is generated. At the instant $m_1$-number of distributed pulses $P_s$ are generated, the pulse distribution end signal is produced and the pulse distribution operation ends, at which time the content of the error computing and storing unit 101e is $-(l_1+l_2)$.

In a case where the machine element continues to be moved by the TC device 102, the feedback pulses Fp are applied to the error computing and storing unit 101e while the pulse distribution operation based on $m_1$ is being executed. The feedback pulses update the unit 101e in the negative (reverse) direction as each one is generated. Accordingly, if we assume that the time at which the content $-(l_1+l_2+m_1)$ is read out of error computing and storing unit 101e is $t_1$, that the time at which the $m_1$-number of distributed pulses $P_s$ are generated is $t_2$, and that $m_2$-number of the feedback pulses Fp are generated between times $t_1$ and $t_2$, then the content of error computing and storing unit 101e at time $t_2$ will be $-(l_1+l_2+m_1)$. Now, when the arithmetic operations (1) and (2) are performed upon generation of the computation end signal, the content of the current position register 202 is updated to $(AP+m_1+m_2)$, and a command equivalent to $m_2$ is applied to the pulse distributor 101d. Thereafter, by exercising control in a similar manner, the content of the current position register 202 will be updated correctly to $AP+\Sigma m_i$, and the content of the error computing and storing unit 101e will become $-(l_1+l_2)$, when the machine element comes to rest upon completion of the control exercised by the TC device 102. Therefore, when the machine tool is subsequently switched back to the NC device 101, the machine element position comes to rest upon moving a distance $l_2$ in a direction which diminishes the accumulated error.

In accordance with the present invention as described and illustrated hereinabove, no error is allowed to accumulate when switching between different control devices in a system for driving a servomotor by means of such control devices. In addition, switching between the control devices does not cause any error in the current position registered within them. As a result, there is no shift in the current position indication, allowing the machine tool element to be controlled with great accuracy.

As many apparently widely different embodiments of the present invention can be made without departing from the spirit and scope thereof, it is to be understood that the invention is not limited to the specific embodiments thereof except as defined in the appended claims.

What we claim is:

1. A method for sensing the current position of a movable element in a position control system operatively connected to receive data and including a motor for driving the movable element, first and second control devices each having means for generating command pulses, each having error storage means for computing and storing an error signal representing the difference between the number of command pulses and feedback pulses each of which is generated whenever the motor rotates by a predetermined amount and each having a current position register for storing the data, said position control system further including a speed control circuit for driving and controlling the motor on the basis of the error signal stored in each of the error storage means, and a switching circuit for connecting one of the first and second control devides to the speed control circuit, the motor being positionally controlled on the basis of the error signal stored in the error storage means by one of the first and second control devices connected to the speed control circuit, data in the current position register being updated by one of the first and second control devices which is not connected to the speed control circuit, and the unconnected control device being enabled to sense the current position of the movable element driven by the motor under the control of the connected control device, said method comprising the steps of:
  (a) reading and storing, as a steady deviation, the error signal in the error storage means of the first control device after the motor is rotated in accordance with the magnitude of drift of a closed loop formed by the second control device, the switching circuit disconnecting the first control device from the speed control circuit and connecting the second control device to the speed control circuit;
  (b) updating the data in the current position register of the first control device while the motor is under the control of the second control device, on the basis of an arithmetic difference found by reading the data in the error storage means of the first control device, which is counting the feedback pulses, and subtracting the stored deviation from the data read from the error storage means of the first control device; and
  (c) revising the data stored in the error storage means of the first control device on the basis of the arithmetic difference determined in said step (b).

2. The method according to claim 1, in which said step (a) comprises the substeps of:
  (i) counting, by way of the error storage means, the number of feedback pulses that accompany rotation of the motor in accordance with the magnitude of drift of the closed loop formed by the second control device; and
  (ii) reading the error signal in the error storage means and storing the error signal as the steady deviation.

3. The method according to claim 2, in which said substep (i) further includes the substep of adding the number of feedback pulses corresponding to the magnitude of drift of the closed loop, formed by the second control device, to the error signal remaining in the error storage means which corresponds to the magnitude of drift of a closed loop formed by the first control device immediately before the first control device is disconnected from the speed control circuit.

4. The method according to claim 1, in which said step (c) comprises the substep of subtracting the arithmetic difference from the data stored in the error storage means.

5. The method according to claim 1, wherein said step (b) further comprises the substep of:
  (i) updating the data in the current position register of the second control device while the second control device is disconnected from the speed control circuit, and the first control device is connected to the speed control circuit by the switching circuit, said updating substep (i) comprising the substeps of:
(aa) updating the data in the current position register of the second control device on the basis of the error signal in the error storage means of the second control device; and
(bb) updating the data in the error storage means on the basis of the error signal.

6. The method according to claim 1, wherein said step (b) is repeated each time step (c) is executed.

7. A method for sensing the current position of a movable element in a position control system including a machine tool circuit having a servomotor, a tracer circuit operatively connected to the machine tool circuit and including a first current position register, and a numerical control circuit operatively connected to the machine tool circuit and including a memory, a second current position register and an error computing and storing unit for storing a steady deviation data, comprising the steps of:
(a) reading and storing the steady deviation data of the error computing and storing unit in the memory after the servomotor has been rotated;
(b) updating the contents of the first current position register using a value obtained by subtracting the contents of the memory unit from the contents remaining in the error computing and storing unit while the servomotor is under the control of the tracer circuit; and
(c) revising the data in the error computing and storing unit based on the value determined in said step (b).

* * * * *

UNITED STATES PATENT AND TRADEMARK OFFICE
CERTIFICATE OF CORRECTION

PATENT NO. : 4,504,772

DATED : MARCH 12, 1985

INVENTOR(S) : HITOSHI MATSUURA ET AL.

It is certified that error appears in the above-identified patent and that said Letters Patent is hereby corrected as shown below:

```
FRONT PAGE [57] ABSTRACT, Col. 2, line 11, "elements"
                              should be --element--.

Col. 2, line 37, delete "is";
       line 38, after "sensing" insert --the--;
       line 39, "illustrative views useful in" should be
                --are diagrams for--.

Col. 4, line 34, "converter" should be --converter,--.

Col. 5, line 39, "101_e" should be --101e--.

Col. 6, line 57, "-1_1" should be ---ℓ_1--;

line 63, "-1_2" should be ---ℓ_2--;

line 64, "1_1 and 1_2" should be --ℓ_1 and ℓ_2--.
```

UNITED STATES PATENT AND TRADEMARK OFFICE
CERTIFICATE OF CORRECTION

PATENT NO. : 4,504,772
DATED : MARCH 12, 1985
INVENTOR(S) : HITOSHI MATSUURA ET AL.

It is certified that error appears in the above-identified patent and that said Letters Patent is hereby corrected as shown below:

Col. 7, line 6, "$1_1$ or $1_2$" should be --$\ell_1$ or $\ell_2$--;

line 10, "$(1_1 + 1_2)$" should be --$(\ell_1 + \ell_2)$--;

line 19, "$1_1$ and $1_2$" should be --$\ell_1$ and $\ell_2$--;

line 30, "a," should be --$\underline{a}$,--;

line 32, "$1_1$)" should be --$\ell_1$)--;

line 33, "$1_1$)" should be --$\ell_1$--;

line 35, "$1_1$" should be --$\ell_1$--;

line 37, "$-1_1$" should be -- $-\ell_1$--;

line 41, "$+1_2$" should be --$+\ell_2$--;

line 43, "$-1_2$" should be -- $-\ell_2$--;

UNITED STATES PATENT AND TRADEMARK OFFICE
CERTIFICATE OF CORRECTION

PATENT NO. : 4,504,772

DATED : MARCH 12, 1985

INVENTOR(S) : HITOSHI MATSUURA ET AL.

It is certified that error appears in the above-identified patent and that said Letters Patent is hereby corrected as shown below:

line 44, "$1_1-1_2$" should be -- $\ell_1-\ell_2$ --;

line 46, "$1_2$" should be -- $\ell_2$ --;

line 47, "$1_2$" should be -- $\ell_2$ --;

line 50, "$-(1_1+1_2)$ and $-1_2$," should be -- $-(\ell_1+\ell_2)$ and $-\ell_2$, --;

line 52, "$1_1+1_2)$" should be -- $\ell_1+\ell_2)$ --;

line 58, "$1_2$," should be -- $\ell_2$, --;

line 59, "$(1_1+1_2)$" should be -- $(\ell_1+\ell_2)$ --;

line 64, $+1_1$" should be -- $+\ell_1$ --;

line 65, "$-1_1$" should be -- $-\ell_1$ --;

line 67, "$21_1+1_2)$" should be -- $2\ell_1+\ell_2)$ --.

UNITED STATES PATENT AND TRADEMARK OFFICE
CERTIFICATE OF CORRECTION

PATENT NO. : 4,504,772
DATED : MARCH 12, 1985
INVENTOR(S) : HITOSHI MATSUURA ET AL.

It is certified that error appears in the above-identified patent and that said Letters Patent is hereby corrected as shown below:

Col. 8, line 1, "$1_1$" should be --$\ell_1$--;

line 2, "$1_1$" should be --$\ell_1$--;

line 4, "$-(1_1+1_2)$ and $-1_1$," should be -- $-(\ell_1+\ell_2)$ and $-\ell_1$,--;

line 6, "$21_1+1_2)$" should be --$2\ell_1+\ell_2)$--;

line 12, "$1_1$ or $1_2$" should be --$\ell_1$ or $\ell_2$--;

line 15, "$(1_1+1_2)$" should be --$(\ell_1+\ell_2)$--;

line 44, "$1_1$ or $1_2$" should be --$\ell_1$ or $\ell_2$--;

line 47, "$-(1_1+1_2)$" should be -- $-(\ell_1+\ell_2)$--;

line 49, "$(1_1+1_2)$" should be --$(\ell_1+\ell_2)$--;

UNITED STATES PATENT AND TRADEMARK OFFICE
CERTIFICATE OF CORRECTION

PATENT NO. : 4,504,772

DATED : MARCH 12, 1985

INVENTOR(S) : HITOSHI MATSUURA ET AL.

It is certified that error appears in the above-identified patent and that said Letters Patent is hereby corrected as shown below:

Col. 8, line 55, "$(1_1+1_2)$" should be --$(\ell_1+\ell_2)$--;

line 58, "$1_1$ or $1_2$" should be --$\ell_1$ or $\ell_2$--;

line 64, "$-(1_1+1_2)$" should be -- $-(\ell_1+\ell_2)$--.

Col. 9, line 8, "a," should be --$\underline{a}$,--;

line 10, "$1_1$" (both occurrences) should be --$\ell_1$--;

"a," should be --$\underline{a}$,--;

line 13, "$1_1$" should be --$\ell_1$--;

line 15, "$-1_1$" should be -- $-\ell_1$--;

line 19, "$1_2$" should be --$\ell_2$--;

line 21, "$1_2$" should be --$\ell_2$--;

UNITED STATES PATENT AND TRADEMARK OFFICE
CERTIFICATE OF CORRECTION

PATENT NO. : 4,504,772

DATED : MARCH 12, 1985

INVENTOR(S) : HITOSHI MATSUURA ET AL.

It is certified that error appears in the above-identified patent and that said Letters Patent is hereby corrected as shown below:

Col. 9, line 22, "$1_1+1_2$" should be --$\ell_1+\ell_2$--;

line 24, "$1_2$," should be --$\ell_2$,--;

line 25, "$1_2$" should be --$\ell_2$--;

line 28, "$-(1_1+1_2)$ and $-1_2$" should be
-- $-(\ell_1+\ell_2)$ and $-\ell_2$--;

line 31, "a" (first occurrence) should be --$\underline{a}$--;
"$1_1+1_2$" should be --$\ell_1+\ell_2$--;

line 32, "$(1_1+1_2)$" should be --$(\ell_1+\ell_2)$--;

line 35, "$-(1_1+1_2)$ (=B)" should be
-- $-(\ell_1+\ell_2)=B$--;

UNITED STATES PATENT AND TRADEMARK OFFICE
CERTIFICATE OF CORRECTION

PATENT NO. : 4,504,772
DATED : MARCH 12, 1985
INVENTOR(S) : HITOSHI MATSUURA ET AL.

It is certified that error appears in the above-identified patent and that said Letters Patent is hereby corrected as shown below:

Col. 9, line 48, "$l_1+l_2$" should be --$\ell_1+\ell_2$--;

line 52, "$l_1+l_2$" should be --$\ell_1+\ell_2$--;

line 53, "$l_1$" should be --$\ell_1$--;

line 55, "$l_2$" should be --$\ell_2$--;

line 56, "$+l_1$" should be --$+\ell_1$--;

line 57, "$l_2$" should be --$\ell_2$--;

line 63, "$l_1$" should be --$\ell_1$--.

Col. 10, line 3, "$l_1$ and $a+l_1+l_2$" should be --$\ell_1$ and $a+\ell_1+\ell_2$--;

line 20, "$-(l_1+l_2)$" should be -- $-(\ell_1+\ell_2)$ --;

UNITED STATES PATENT AND TRADEMARK OFFICE
CERTIFICATE OF CORRECTION

PATENT NO. : 4,504,772
DATED : MARCH 12, 1985
INVENTOR(S) : HITOSHI MATSUURA ET AL.

It is certified that error appears in the above-identified patent and that said Letters Patent is hereby corrected as shown below:

Col. 10, line 24, "$1_2$" should be --$\ell_2$--;

line 30, "$-(1_1+1_2)$" should be -- $-(\ell_1+\ell_2)$--;

line 32, "$1_2$" should be --$\ell_2$--;

line 53, "$1_2$" should be --$\ell_2$--;

line 54, "$1_2$" should be --$\ell_2$--;

line 56, "$-(1_1+1_2)$" should be -- $-(\ell_1+\ell_2)$--;

line 67, "$-(1_1+1_2)$" should be -- $-(\ell_1+\ell_2)$--.

Col. 11, line 3, "$1_1+1_2$" should be --$\ell_1+\ell_2$--;

line 18, "$1_1+1_2$" should be --$\ell_1+\ell_2$--;

line 26, "$1_1+1_2$" should be --$\ell_1+\ell_2$--;

UNITED STATES PATENT AND TRADEMARK OFFICE
CERTIFICATE OF CORRECTION

PATENT NO. : 4,504,772

DATED : MARCH 12, 1985

INVENTOR(S) : HITOSHI MATSUURA ET AL.

It is certified that error appears in the above-identified patent and that said Letters Patent is hereby corrected as shown below:

Col. 11, line 31, after "of" insert --the--;

line 32, "$1_1+1_2$" should be --$\ell_1+\ell_2$--;

line 41, "$-(1_1+1_2)$," should be -- $-(\ell_1+\ell_2)$--;

line 46, "$1_2$" should be --$\ell_2$--.

Col. 12, line 11, "devides" should be --devices--.

Signed and Sealed this

Fifteenth Day of October 1985

[SEAL]

Attest:

DONALD J. QUIGG

Attesting Officer

Commissioner of Patents and Trademarks—Designate